Patented Nov. 22, 1938

2,137,758

UNITED STATES PATENT OFFICE 2,137,758

LIQUID EGG AND PROCESS OF MAKING SAME

Herman Heuser, Evanston, Ill.

No Drawing. Application November 11, 1935, Serial No. 49,251

5 Claims. (Cl. 99—113)

My invention relates to the preparation of liquid egg and preferably (though not exclusively) to the preparation of sugared liquid egg and the product produced thereby. In accordance with my new process the attractive uniform opaque or opalescent appearance of sugared liquid egg is preserved.

I have observed that sugared liquid egg, whether sterilized or not, loses its attractive uniform opalescent or opaque appearance upon standing, the egg becomes muddy, and this is the case whether or not the liquid egg contains a preserving amount of sugar or a non-preserving amount of sugar and whether it is sterilized or not. With a preserving amount of sugar in the liquid egg the muddying of the egg is only delayed, but with a non-preserving amount of sugar in the egg the sugared egg, when sterilized, forms a voluminous sediment already during sterilization. A liquid egg containing a small amount of sugar or no sugar is opaque, but when it contains a large amount of sugar, such as a preserving quantity of sugar, it is opalescent.

The muddying of the sugared liquid egg is due to the coagulation of the albumen contained in the liquid egg in more or less undissolved condition.

I have discovered that the coagulation of the albumen in sugared liquid egg can be prevented by adding to the sugared liquid egg a proteolytic enzyme that does not act hydrolyzing upon raw egg albumen such as, for example, papain. I generally add the papain to the sugared liquid egg in the proportion of 0.005 to 0.014 part by weight of papain to 100 parts by weight of the sugared liquid egg. However, a somewhat smaller or a somewhat larger portion of papain may be employed to carry out my invention with satisfactory results.

It is pointed out here that the addition of a proteolytic enzyme other than one that does not act hydrolyzing upon raw egg albumen does not prevent the muddying of the egg; on the contrary it hastens the muddying. Thus pepsin added to sugared liquid raw egg rapidly muddies the egg whether the egg contains a preserving amount of sugar or a non-preserving amount of sugar, and whether the egg is sterilized or not and whether the amount of pepsin added to the egg is relatively small or relatively large.

However, when papain is contained in the sugared liquid egg to which pepsin has been added, the pepsin does not muddy the egg but the egg retains its attractive uniform opalescency or opaqueness. As the papain acts upon the pepsin, so it also acts upon the proteolytic enzymes naturally contained in egg, which enzymes would otherwise act coagulating upon raw egg albumen. This may be the reason why a papain containing sugared egg does not become muddy.

This invention constitutes a most remarkable improvement in the preparation of sterilized sugared egg, for it makes it possible to carry out the preservation of sugared liquid egg by heat or by any other means such as sugar or cold without the customary muddying of the egg by albumen coagulation. It is also applicable to egg containing a relatively small amount of sugar.

This invention also makes it possible to prevent the muddying of frozen egg generally in the form of frozen egg yolk containing usually a relatively small amount of sugar, about 15 to 25 percent. As it is now, frozen egg prepared without the use of my invention loses its attractive uniform opaque apearance, and is in a muddy condition or rapidly becomes muddy from albumen coagulation when it is taken from cold storage to the bakers or ice cream manufacturers. With its albumen in coagulated condition, frozen egg is readily attacked by microorganisms imparting to the egg a spoiled taste and flavor when not any more in cold storage.

Among the objects of my invention are to eliminate the disadvantages and accomplish the advantages and new results set forth above.

Other objects, advantages and capabilities inherent in the present invention will later more fully appear.

While I have set forth herein certain ingredients, proportions and steps, I wish it understood that the same are susceptible of modification and change without departing from the spirit of my invention.

In the following I will describe a process suitable to carry out my invention for the preparation of sugared liquid egg containing a non-preserving amount of sugar.

Whole egg deprived of the shell is liquefied in its moisture content by any suitable stirring device. Thereupon, sucrose in the form of granulated cane sugar is dissolved in the liquid egg in the proportion of say, 35 parts by weight of sucrose to 65 parts by weight of egg. Thereupon, commercial papain in powder form is added to the egg in the proportion of 0.009 part by weight of papain to 100 parts by weight of the sugared liquid egg. It is preferred, although not indispensable, to liquefy the papin powder in a small portion of the sugared liquid egg before it is mixed with the bulk of the egg.

Thereupon, after the air has been preferably removed from the sugared liquid egg in any suitable manner, that is to say, after the egg has been demulsified, a small portion of a reducing agent say, for example, sodium hypophosphite or other suitable reducing agent, may be added to the egg in the proportion of 0.10 part by weight of reducing agent to 100 parts by weight of egg. Thereupon, the egg is filled into suitable trade containers, which are hermetically sealed and then sterilized by heat at a suitable temperature of say 73° C. for a suitable length of time, which is, for metal trade containers having a diameter of 2.5 inches about 20 minutes and for glass containers having the same diameter about 25 to 30 minutes.

If the preserved sugared liquid egg containing a non-preserving amount of sugar is to be made from egg yolk instead of from whole egg, the process is the same as for the preparation of the aforesaid described preserved sugared liquid whole egg.

The sterilized liquid egg thus produced in the form of sugared whole egg or egg yolk with a non-preserving amount of sugar is uniformly opaque and of a light orange color with regard to the sugared liquid whole egg and of a deep orange color with regard to the sugared liquid egg yolk. The taste and flavor of the sterilized liquid egg are the same as those of raw whole egg or raw egg yolk having a sugary taste, the sugar taste being mild because of the highly colloidal character of the raw egg greatly reducing the sweetness of the sugar.

Upon standing in the hermetically sealed containers, the heat sterilized sugared egg product does not depreciate, it keeps up its attractive opaque appearance and its pure raw egg taste and flavor during sterilization and upon standing at ordinary room temperature for any length of time.

If the new egg product is to be made with a preserving amount of sugar, which is around 50 percent or more, then the product does not need to be sterilized. However, it may be sterilized if desired.

The new egg product in the form of heat sterilized sugared liquid egg or in the form of sugar preserved liquid egg made from whole egg or egg yolk, may be sold directly from the shelves of the stores and it may be used for sanitary ice cream making in the factory and in the home and it may be also used for baking and other purposes.

The new sterilized egg product may be also used at the table instead of the customary coagulated or boiled egg in the shell. Its raw taste and flavor combined with a mild sugary taste makes the egg more pleasing to the palate than the customary boiled egg because of its sugar content which being mild because of the highly colloidal character of raw egg is unusually pleasing to the palate.

The new egg product whether preserved by heat or sugar or cold, retains its highly attractive uniform opaqueness or opalescence for practically any length of time. This means to say that the new egg product is durable against albumen coagulation.

In the following claims the term "liquid egg" is intended to include either liquid egg yolk or liquid whole egg.

Having now described my invention, I claim:

1. The process of making preserved liquid egg, which consists in liquefying fresh egg in its moisture content, dissolving in the egg a non-preserving amount of sugar, adding to the egg a minor portion of papain that does not act hydrolyzing upon the raw egg albumen, removing the air from the egg, and sterilizing the egg.

2. In the process of making preserved liquid egg, the step which consists in dissolving in fresh liquid egg a non-preserving amount of sugar and a minor portion of papain.

3. Heat sterilized fresh liquid egg containing a non-preserving amount of sugar and a minor portion of papain.

4. Frozen fresh egg containing a non-preserving amount of sugar, and a minor portion of papain.

5. Preserved fresh liquid egg containing a non-preserving amount of sugar, a minor portion of papain and a minor portion of a sodium hypophosphite.

HERMAN HEUSER.